(12) United States Patent
Liu et al.

(10) Patent No.: US 9,400,344 B2
(45) Date of Patent: Jul. 26, 2016

(54) LIQUID CRYSTAL LENS COMPRISING A PLURALITY OF LENS ELECTRODE GROUPS AND PROCESS FOR MANUFACTURING THE SAME, STEREOSCOPIC DISPLAY DEVICE AND PROCESS FOR MANUFACTURING THE SAME

(71) Applicant: Tianma Micro-Electronics Co., Ltd., Shenzhen (CN)

(72) Inventors: Xiaolin Liu, Shenzhen (CN); Jia Xie, Shenzhen (CN); Yongdong Zhang, Shenzhen (CN)

(73) Assignee: Tianma Micro-Electronics Co., Ltd., Shenzhen (CN)

( * ) Notice: Subject to any disclaimer, the term of this patent is extended or adjusted under 35 U.S.C. 154(b) by 171 days.

(21) Appl. No.: 14/142,455

(22) Filed: Dec. 27, 2013

(65) Prior Publication Data
US 2015/0002765 A1    Jan. 1, 2015

(30) Foreign Application Priority Data
Jun. 28, 2013    (CN) .......................... 2013 1 0270544

(51) Int. Cl.
*G02F 1/13*    (2006.01)
*G02B 3/12*    (2006.01)
(Continued)

(52) U.S. Cl.
CPC ............... *G02B 3/12* (2013.01); *G02F 1/13394* (2013.01); *G02F 1/29* (2013.01); *G02F 1/1347* (2013.01); *G02F 1/134309* (2013.01); *G02F 2001/294* (2013.01); *Y10T 29/49155* (2015.01)

(58) Field of Classification Search
CPC ............... G02B 3/12; G02B 1/134309; G02B 2001/294

USPC .................................................. 349/200–201
See application file for complete search history.

(56) References Cited

U.S. PATENT DOCUMENTS

2008/0252830 A1* 10/2008 Son ..................... G02F 1/13394
                                            349/106
2012/0001890 A1    1/2012 Kook et al.
(Continued)

FOREIGN PATENT DOCUMENTS

CN            1721926 A      1/2006
CN          201716500 U      1/2011
(Continued)

OTHER PUBLICATIONS

First Office Action as issued in corresponding Chinese Application No. 201310270544.5, dated Jan. 6, 2016.
(Continued)

*Primary Examiner* — Paul Lee
(74) *Attorney, Agent, or Firm* — Alston & Bird LLP

(57) ABSTRACT

A liquid crystal lens is disclosed. The lens includes a first transparent substrate and a second transparent substrate opposite the first transparent substrate. The lens also includes a liquid crystal layer between the first and second transparent substrates, and a first electrode layer on an internal surface of the first transparent substrate, where the first electrode layer includes a plurality of lens electrode groups, and where each of the lens electrode groups includes a plurality of strip electrodes. The lens also includes a second electrode layer on an internal surface of the second transparent substrate, and a column spacer between the first electrode layer and the second electrode layer, where the column spacer is between two adjacent lens electrode groups.

13 Claims, 4 Drawing Sheets

(51) Int. Cl.
  *G02F 1/1339* (2006.01)
  *G02F 1/29* (2006.01)
  *G02F 1/1343* (2006.01)
  *G02F 1/1347* (2006.01)

(56) References Cited

U.S. PATENT DOCUMENTS

| | | | |
|---|---|---|---|
| 2012/0218490 A1* | 8/2012 | Takama | G02B 3/005 349/57 |
| 2012/0320288 A1* | 12/2012 | Baek | G02B 3/14 349/5 |
| 2013/0063691 A1 | 3/2013 | Takama et al. | |
| 2014/0168547 A1 | 6/2014 | Takama et al. | |

FOREIGN PATENT DOCUMENTS

| | | |
|---|---|---|
| CN | 102314014 A | 1/2012 |
| CN | 102402013 A | 4/2012 |
| CN | 102650791 A | 8/2012 |
| CN | 102967969 A | 3/2013 |
| EP | 2565707 A1 | 3/2013 |
| GB | 2347006 A | 8/2000 |
| KR | 100848949 B1 | 7/2008 |

OTHER PUBLICATIONS

Extended European Search Report for Application No. 14150064.5, mailed on Nov. 24, 2014, 11 pages total.

* cited by examiner

LIQUID CRYSTAL LENS COMPRISING A PLURALITY OF LENS ELECTRODE GROUPS AND PROCESS FOR MANUFACTURING THE SAME, STEREOSCOPIC DISPLAY DEVICE AND PROCESS FOR MANUFACTURING THE SAME

CROSS-REFERENCES TO RELATED APPLICATIONS

This application claims the benefit of priority to Chinese Patent Application No. 201310270544.5, filed with the Chinese Patent Office on Jun. 28, 2013 and entitled "LIQUID CRISTAL LENS AND PROCESS FOR MANUFACTURING THE SAME, STEREOSCOPIC DISPLAY DEVICE AND PROCESS FOR MANUFACTURING THE SAME", the contents of which is incorporated herein by reference in its entirety.

FIELD OF THE INVENTION

The present invention relates to three-dimensional stereoscopic display, and in particular to a liquid crystal lens and a process for manufacturing the same, and a stereoscopic display device and a process for manufacturing the same.

BACKGROUND OF THE INVENTION

The three-dimensional (3D) stereoscopic display technology is one of the hottest display technologies nowadays. Currently there are two trends in the 3D stereoscopic display technology. One is the 3D stereoscopic display technology in which wearing glasses is necessary. The other is the naked eye 3D stereoscopic display technology. The naked eye 3D stereoscopic display technology is a hot spot of research due to the convenience and low cost resulted from the fact that wearing glasses is unnecessary.

The naked eye 3D stereoscopic display technology may be achieved by providing a liquid crystal lens in front of a display panel of a stereoscopic display device. The principle of 3D display in the stereoscopic display device including the liquid crystal lens is as follows. When a light beam emitted from the display panel passes through the liquid crystal lens, the propagation direction of the light beam is changed by liquid crystal molecules in a specific arrangement in the liquid crystal lens. After running through the liquid crystal lens, the light beam will be respectively collected in the left eye and the right eye of a viewer. Two different images of the same picture are obtained in the left eye and the right eye, and the two images are recombined in the brain of the viewer. Therefore a 3D stereoscopic visual image is perceived by the viewer, i.e., the 3D stereoscopic display is achieved. It should be noted that when 3D stereoscopic display is not required, the liquid crystal molecules in the liquid crystal lens may be controlled to be in a full transmittance arrangement, the whole liquid crystal lens acts as a transparent substrate, and the light may pass through the liquid crystal lens directly. At this point, the stereoscopic display device may perform a two-dimensional (2D) plane display. As it can be seen, the stereoscopic display device with the liquid crystal lens may switch between the 2D plane display and the 3D stereoscopic display.

However, a crosstalk phenomenon may occur when the existing stereoscopic display device with the liquid crystal lens performs the 3D stereoscopic display. The crosstalk caused by the liquid crystal lens refers to such a phenomenon as follows: an image which should not be seen by one of eyes of a viewer is seen by the eye of the viewer, resulting in an overlapping of images. The reason of the crosstalk phenomenon caused by the liquid crystal lens is: the liquid crystal lens can be divided into a plurality of lens units, and liquid crystal molecules at the junction of adjacent lens units may be disordered, resulting in an abnormal refraction and an abnormal propagation of some lights.

Although some solutions have been proposed to avoid the crosstalk phenomenon caused by the liquid crystal lens in the industry, current solutions either is less desirable, or causes other adverse impacts. To this end, it is desired to provide a new liquid crystal lens and a process for manufacturing the same, and a stereoscopic display device and a process for manufacturing the same, to avoid the crosstalk phenomenon caused by the liquid crystal lens.

BRIEF SUMMARY OF THE INVENTION

One inventive aspect is a liquid crystal lens. The liquid crystal lens includes a first transparent substrate and a second transparent substrate opposite to the first transparent substrate. The lens also includes a liquid crystal layer between the first transparent substrate and the second transparent substrate, a first electrode layer on an internal surface of the first transparent substrate, where the internal surface of the first transparent substrate is proximal to the liquid crystal layer, and where the first electrode layer includes a plurality of lens electrode groups. In addition, each of the lens electrode groups includes a plurality of strip electrodes. The lens also includes a second electrode layer on an internal surface of the second transparent substrate, where the internal surface of the second transparent substrate is proximal to the liquid crystal layer, and a column spacer between the first electrode layer and the second electrode layer, where the column spacer is between two adjacent lens electrode groups.

Another inventive aspect is a stereoscopic display device. The device includes a display panel and a liquid crystal lens. The liquid crystal lens includes a first transparent substrate and a second transparent substrate opposite to the first transparent substrate. The lens also includes a liquid crystal layer between the first transparent substrate and the second transparent substrate, a first electrode layer on an internal surface of the first transparent substrate, where the internal surface of the first transparent substrate is proximal to the liquid crystal layer, and where the first electrode layer includes a plurality of lens electrode groups. In addition, each of the lens electrode groups includes a plurality of strip electrodes. The lens also includes a second electrode layer on an internal surface of the second transparent substrate, where the internal surface of the second transparent substrate is proximal to the liquid crystal layer, and a column spacer between the first electrode layer and the second electrode layer, where the column spacer is between two adjacent lens electrode groups.

Another inventive aspect is a process for manufacturing a liquid crystal lens. The method includes providing a first transparent substrate, where the first transparent substrate includes a first electrode layer, the first electrode layer includes a plurality of lens electrode groups, and each of the lens electrode groups includes a plurality of strip electrodes. The method also includes providing a second transparent substrate, where the second transparent substrate includes a second electrode layer, forming a column spacer on the first electrode layer or on the second electrode layer, and fixing the first transparent substrate and the second transparent substrate together to form a liquid crystal cell. The column spacer is disposed between the first electrode layer and the second electrode layer and between two adjacent lens electrode groups. The method also includes filling liquid crystal between the first transparent substrate and the second transparent substrate.

DETAILED DESCRIPTION OF THE INVENTION

The existing liquid crystal lens typically includes a plurality of lens units, and a disordered arrangement may tend to happen to liquid crystal molecules at the junction of adjacent lens units. Once the disordered arrangement happens, a crosstalk phenomenon caused by the liquid crystal lens will happen when a stereoscopic display device having the liquid crystal lens performs the 3D stereoscopic display. To this end, the present invention provides a liquid crystal lens. The liquid crystal lens is provided with a column spacer at the junction of adjacent lens units to avoid the disordered arrangement from happening at the junction of adjacent lens units, solving the problem that the crosstalk phenomenon caused by the liquid crystal lens happens when the stereoscopic display device performs the 3D stereoscopic display.

To make the object, features and advantages of the invention more obvious and easy to be understood, in the following, particular embodiments of the invention will be explained in detail in conjunction with the drawings.

An Embodiment

Figure 1:
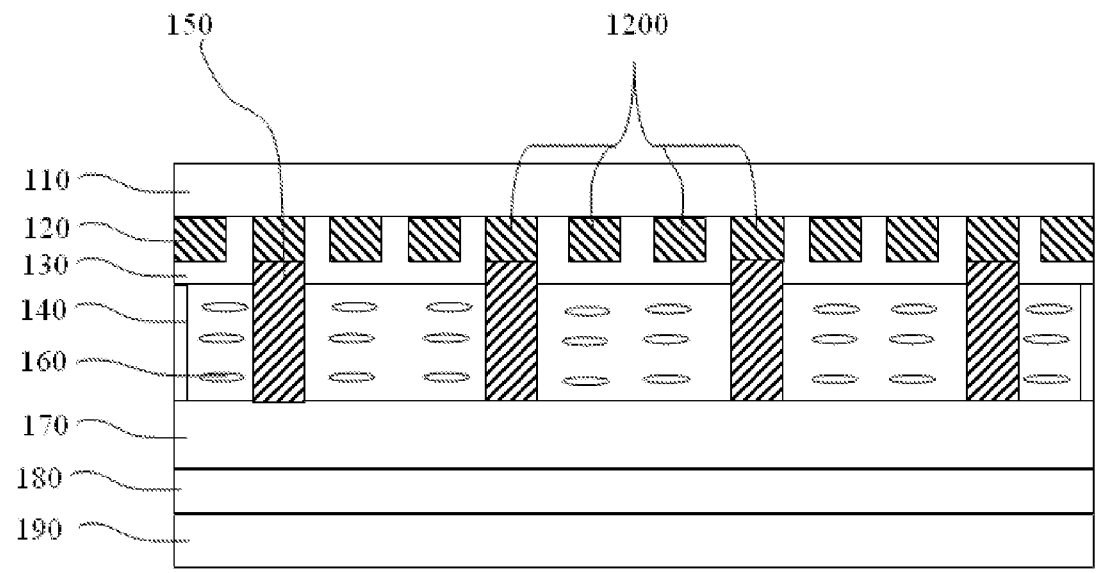
FIG. 1 is a structural schematic diagram of a liquid crystal lens according to an embodiment of the present invention.

An embodiment of the present invention provides a liquid crystal lens. Referring to FIG. 1, FIG. 1 is a structural schematic diagram of a liquid crystal lens according to an embodiment of the present invention. The liquid crystal lens includes a first transparent substrate 110 and a second transparent substrate 190 disposed opposite to the first transparent substrate. A first electrode layer (not labeled) including a plurality of strip electrodes 120 is disposed on an internal surface of the first transparent substrate 110, and adjacent strip electrodes 120 are spaced with a gap (not shown). The strip electrodes 120 are covered with a first alignment layer 130 (i.e., the first electrode layer is covered with the first alignment layer 130), and the first alignment layer 130 also covers the gaps between the strip electrodes 120. A second electrode layer 180 is disposed on the internal surface of the second transparent substrate 190, and the second electrode layer 180 is covered with a second alignment layer 170. A liquid crystal layer 160 is disposed between the first alignment layer 130 and the second alignment layer 170. The liquid crystal lens also includes sealant 140, the sealant 140 is disposed at the periphery of the internal surfaces of both of the first transparent substrate 110 and the second transparent substrate 190, so as to seal the liquid crystal layer 160 sandwiched between the first alignment layer 130 and the second alignment layer 170.

Still referring to FIG. 1, the liquid crystal lens according to the present embodiment further includes a column spacer 150 disposed between the first transparent substrate 110 and the second transparent substrate 190. More specifically, the column spacer 150 is connected between a strip electrode 120 and the second alignment layer 170. However, not each of the strip electrodes 120 is correspondingly connected with one column spacer 150. In the present embodiment, one lens electrode group 1200 comprises every four successive strip electrodes 120. In each lens electrode group 1200, the first strip electrode 120 and the last strip electrode 120 are respectively correspondingly connected with one column spacer 150, but the strip electrodes 120 at other positions in the lens electrode group 1200 are not connected with the column spacer 150.

It should be noted that, because the strip electrodes 120 are covered with the first alignment layer 130, and the column spacers 150 are connected between the strip electrodes 120 and the second alignment layer 170, it may be considered from a view point of the structure that the column spacer 150 is disposed on the strip electrode 120 by running through the first alignment layer 130. In the manufacturing process, it is possible to dispose the column spacer 150 on a corresponding strip electrode 120 and then manufacture the first alignment layer 130 to cover other strip electrodes 120.

In the present embodiment, each lens electrode group 1200 corresponds to one lens unit. The lens unit refers to liquid crystal molecules divided as a unit having the function of lens for achieving the stereoscopic display. The liquid crystal layer 160 can be divided into a plurality of lens units disposed between the lens electrode groups 1200 and the second electrode layer 180. The lens unit may realize either the function of a convex lens or the function of a concave lens to transmit lights to respective eyes of a viewer, thus the stereoscopic display is achieved. Each lens electrode group 1200 corresponds to one lens unit, and both the first strip electrode 120 and the last strip electrode 120 in each lens electrode group 1200 are respectively connected with one column spacer 150; meanwhile the column spacer 150 is connected with both the strip electrode 120 and the second alignment layer 170. As a result, it may be known that the column spacer 150 is disposed at the junction of adjacent lens units, i.e., the column spacer 150 replaces liquid crystal molecules which were previously disposed between two adjacent lens units, and two adjacent lens units are separated by the column spacer 150.

It should be noted that although in FIG. 1 the four successive strip electrodes 120 are labeled as one lens electrode group 1200, the first strip electrode 120 and the fourth strip electrode 120 in the four successive strip electrodes 120 of each lens electrode group 1200 are respectively shared by two lens electrode groups 1200 because the strip electrodes 120 are in a consecutive arrangement. In addition, in other embodiments of the present invention, the number of the strip electrodes 120 included in one lens electrode group 1200 may differ as desired. For example, there may be two strip electrodes 120, three strip electrodes 120, five strip electrodes 120 or more strip electrodes 120 in one lens electrode group 1200, but it is necessary to ensure that one lens electrode group 1200 corresponds to one lens unit.

Figure 2:
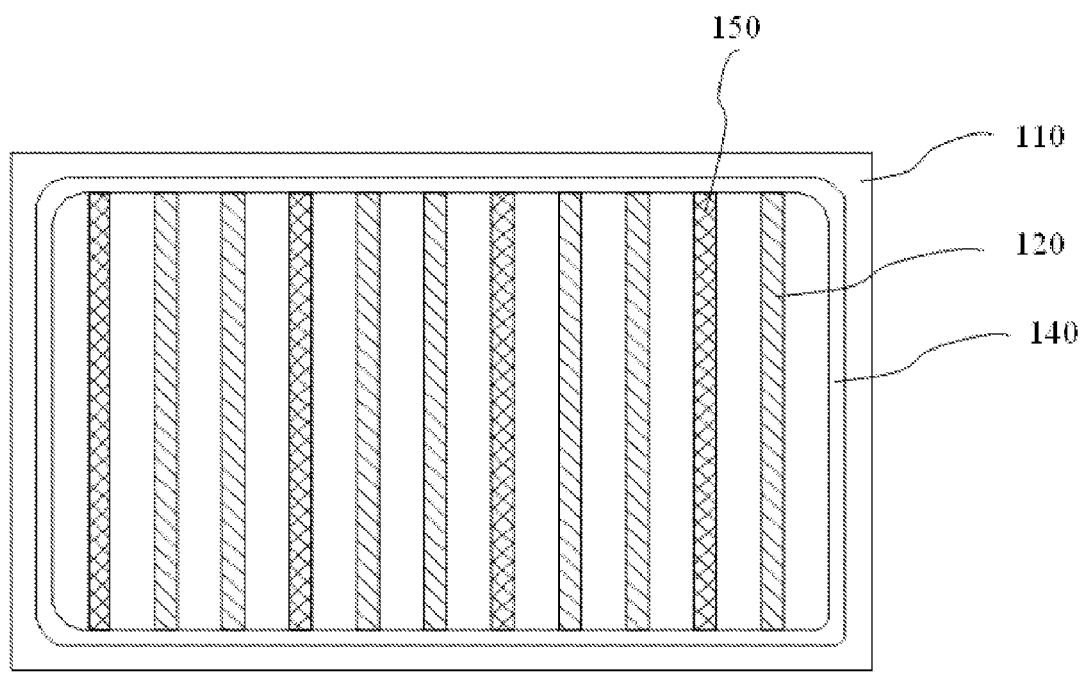
FIG. 2 is a schematic diagram of structures on a first transparent substrate of the liquid crystal lens according to an embodiment of the present invention.

Referring to FIG. 2, FIG. 2 is a schematic diagram of structures on the first transparent substrate of the liquid crystal lens according to an embodiment of the present invention. As can be seen from FIG. 2, a plurality of strip electrodes 120 are disposed on the internal surface of the first transparent substrate 110; each strip electrode 120 extends in a first direction and a plurality of strip electrodes 120 are juxtaposed with each other along a second direction, where the first direction intersects with the second direction. In the present embodiment, in the plane shown in FIG. 2, the first direction is a column direction, and the second direction is a row direction, and the first direction intersects perpendicularly with the second direction. The first alignment layer 130 (referring to FIG. 1) covering the strip electrodes 120 is omitted in FIG. 2. The strip electrodes 120 are surrounded by the sealant 140. It can also be seen from FIG. 2 that the column spacers 150 are also disposed on the internal surface of the first transparent substrate 110. In the present embodiment, the column spacers 150 are parallel to the strip electrodes 120, and the projection of the column spacer 150 on the internal surface of the first transparent substrate 110 and the projection of the strip electrode 120 on the internal surface of the first substrate 110 are both in the shape of straight line and have the same size. The column spacer 150 is disposed on the strip electrode 120, but the strip electrode 120 below the column spacer 150 is not shown in FIG. 2 because FIG. 2 is a plan view of the internal surface of the first transparent substrate 110.

Figure 3:
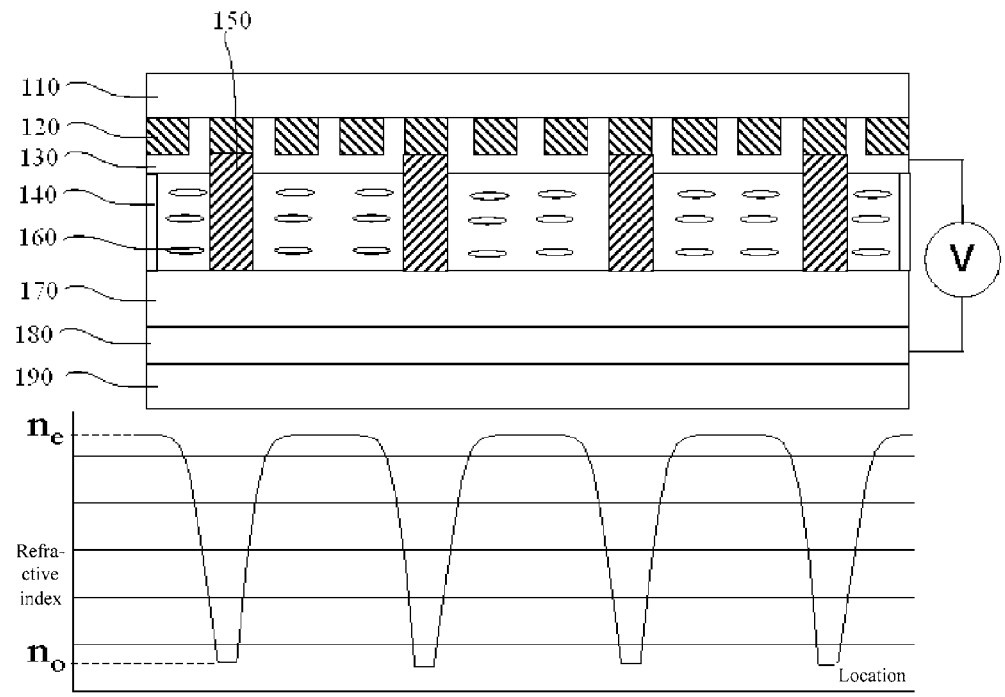
FIG. 3 is a schematic diagram of distribution of refractive indexes at respective position of the liquid crystal lens when the liquid crystal lens according to an embodiment of the present invention performs the 3D stereoscopic display.

Referring to FIG. 3, FIG. 3 is a schematic diagram of distribution of refractive indexes at respective position of the liquid crystal lens when the liquid crystal lens according to an embodiment of the present invention performs the 3D stereoscopic display. FIG. 3 may be divided into an upper part and a lower part. The upper part is a structural schematic diagram of the liquid crystal lens of the present embodiment, and the lower part is a schematic diagram of distribution of refractive indexes at corresponding positions of the liquid crystal lens. In the present embodiment, the material of the column spacer 150 comprises a photoreactive polymer material, such as a photoresist material, the refractive index of the column spacer 150 is set to be essentially equal to the refractive index of the liquid crystal layer 160 in a full transmittance state. The refractive index of the column spacer 150 in the present embodiment is in a range of 1.45~1.85, and the specific refractive index of the column spacer 150 can be defined according to the refractive index of the liquid crystal layer 160 in the full transmittance state. As can be seen from FIG. 3, a specific voltage V is applied between the strip electrodes 120 of the liquid crystal lens and the second alignment layer 170 of the liquid crystal lens. At this point, the liquid crystal lens performs the 3D stereoscopic display, and the liquid crystal molecules of each lens unit (i.e., the liquid crystal molecules between the two adjacent column spacers 150) in the liquid crystal layer 160 are in a special arrangement. The refractive indexes at respective positions of the liquid crystal lens in FIG. 3 are correspondingly shown in the location-refractive index diagram presented under the structural schematic diagram of the liquid crystal lens. There is a refractive index distribution curve in the diagram, and the distribution curve has a maximum value $n_e$ and a minimum value $n_0$. It can be intuitively determined from the diagram that the refractive index corresponding to the column spacer 150 is $n_0$, and the maximum value $n_e$ corresponds to most of the center region of each lens unit. The whole refractive index distribution curve is in a regular periodic arrangement, and the part of the refractive index distribution curve corresponding to each lens unit has a shape similar to the letter "n". The reason lies in that in each lens unit, the refractive index increases gradually from the minimum value $n_e$ corresponding to the column spacers 150 on both sides to the maximum value $n_e$ corresponding the most of the center region due to the specific arrangement of the liquid crystal molecules.

In the liquid crystal lens according to the present embodiment, the column spacer 150 disposed at the junction of two adjacent lens units replaces the liquid crystal molecules previously disposed at the junction of the two adjacent lens units. Because the liquid crystal molecules disposed at the junction of the two adjacent lens units may be affected by an electric field generated by two different lens electrode groups 1200, an arrangement defect such as a disclination tends to occur, i.e., a disorder may occur, resulting in the crosstalk problem when the liquid crystal lens performs the 3D display. By contrast, in the liquid crystal lens according to the present embodiment, the column spacer 150 replaces the liquid crystal molecules previously disposed at the junction of the two adjacent lens units. In this way, the disordered arrangement of the liquid crystal molecules at the junction of the two adjacent lens units can be avoided, and the crosstalk phenomenon caused by the liquid crystal lens can also be avoided.

In the liquid crystal lens according to the present embodiment, the column spacers 150 are disposed at the junctions of every two adjacent lens units, so the column spacers 150 are in a periodic arrangement. And the lens units are also in a periodic arrangement. Therefore, the column spacers 150 and the lens units form a dual periodic structure. On the contrary, there is no column spacer 150 in the existing liquid crystal lens, and the lens units are in a single periodic structure; and typically the black matrix in the display panel is also in a single periodic structure. Therefore, the interference phenomenon of lights may tend to happen due to the single periodic structure of the lens units in the conventional liquid crystal lens and the single periodic structure of the black matrix in the display panel, resulting in the moire pattern. In the liquid crystal lens according to the present invention, the interference phenomenon of lights does not tend to occur for the above-mentioned dual periodic structure and the single periodic structure of the black matrix in the display panel, thus the moire pattern is avoided.

In the liquid crystal lens according to the present embodiment, the column spacers 150 are disposed at the junction of the two adjacent lens units, the shape of the spacers 150 is columnar. The column spacers 150 function as supports between the first transparent substrate 110 and the second transparent substrate 190 so that the distance between the first transparent substrate 110 and the second transparent substrate 190 maintains uniform. On the contrary, in the existing liquid crystal lens, spherical spacers are typically disposed between an upper transparent substrate and a lower transparent substrate to keep a distance between the upper transparent substrate and the lower transparent substrate uniform. Typically the spherical spacers are randomly dispersed between the upper transparent substrate and the lower transparent substrate, i.e., randomly dispersed among liquid crystal molecules. The refractive index of the liquid crystal molecule may change. When the refractive index of the spherical spacer differs greatly from the refractive index of the liquid crystal molecules around the spherical spacer, the lights may be scattered, which may impact the display effect. As can be seen from FIG. 3, in the liquid crystal lens according to the present embodiment, the liquid crystal molecules around the spherical spacer have a specific refractive index when the 3D display is performed. A appropriate material may be selected such that the refractive index of the column spacer 150 may be substantially the same as the refractive index of the liquid crystal molecules around the column spacer 150. Therefore, the scattering of lights may be avoided, and a normal display of the liquid crystal lens is ensured.

Another Embodiment

Figure 4:
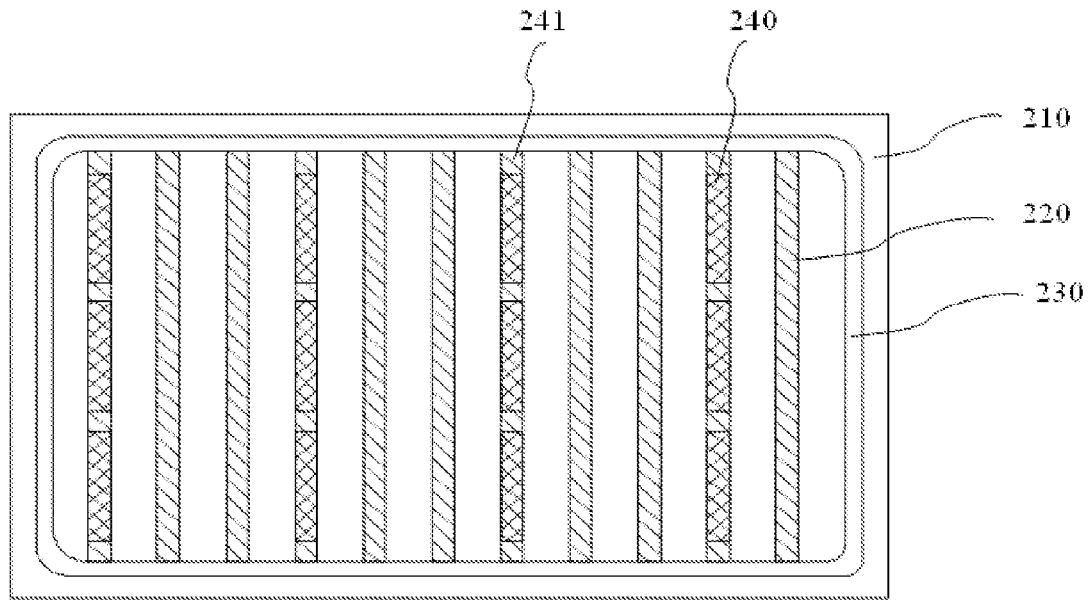
FIG. 4 is a schematic diagram of structures on a first transparent substrate of a liquid crystal lens according to another embodiment of the present invention.

Another embodiment of the present invention provides another liquid crystal lens. Referring to FIG. 4, FIG. 4 is a schematic diagram of structures on a first transparent substrate 210 of a liquid crystal lens according to another embodiment of the present invention. A first electrode layer (not labeled) including a plurality of strip electrodes 220 is disposed on the first transparent substrate 210, and the strip electrodes 220 are surrounded by sealant 230. Four strip electrodes 220 constitute one strip transparent electrode group (not labeled). In each strip transparent electrode group, the first strip electrode 220 and the last strip electrode 220 are respectively connected with the column spacer 240. For the description of the first transparent substrate 210, the strip electrode 220, the sealant 230 and the column spacer 240, reference can be made to the description of the first embodiment. The liquid crystal lens according to the present embodiment also includes the liquid crystal layer, a second transparent substrate and structures disposed on the second transparent substrate, the liquid crystal layer, the second transparent substrate and structures disposed on the second transparent substrate are not shown separately in FIG. 4 and reference may be made to the corresponding description of the first embodiment.

The liquid crystal lens according to the present embodiment differs from the liquid crystal lens in the first embodiment in that in the present embodiment, each column spacer 240 has four openings 241 running through the column spacer 240 in the width direction of the column spacer 240, and the four openings 241 are distributed evenly in the column spacers 240 (i.e., the distances between adjacent openings 241 are equal). In the present embodiment, the width of the opening 241 may be in a range of 1 µm~50 µm, and the height of the opening 241 is greater than or equal to 10 µm and is less than or equal to the height of the column spacer 240. The openings 241 are disposed so that lens units interpenetrate each other, facilitating the vacuum pumping in the manufacturing process for the liquid crystal lens, and also facilitating the injection of the liquid crystal. It should be noted that, in other embodiments of the present invention, the number of the openings 241 in the column spacer 240 can be adjusted according to actual need.

Another Embodiment

Figure 5:
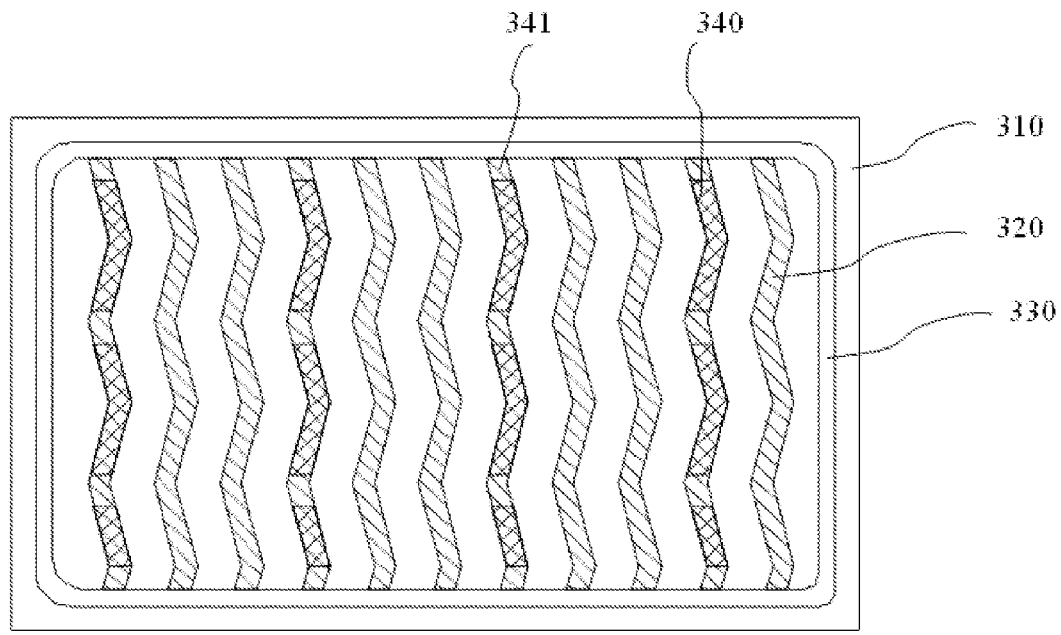
FIG. 5 is a schematic diagram of structures on a first transparent substrate of a liquid crystal lens according to another embodiment of the present invention.

Another embodiment of the present invention further provides another liquid crystal lens. Referring to FIG. 5, FIG. 5 is a schematic diagram of structures on a first transparent substrate 310 of a liquid crystal lens according to another embodiment of the present invention. A first electrode layer (not labeled) including a plurality of strip electrodes 320 is disposed on the first transparent substrate 310, and the strip electrodes 320 are surrounded by sealant 330. Four strip electrodes 320 constitute one strip transparent electrode group (not labeled), and in each strip transparent electrode group, the first strip electrode 320 and the last strip electrode 320 are respectively connected with the column spacer 340. Each of the column spacers 340 has four openings 341 running through the column spacer 340 in the width direction of the column spacer 340, and the four openings 341 are distributed evenly in the column spacers 340. For the description of the first transparent substrate 310, the strip electrode 320, the sealant 330, the column spacer 340 and the opening 341, reference may be made to the description of the second embodiment. The liquid crystal lens according to the present embodiment also includes a liquid crystal layer, a second transparent substrate and structures disposed on the second transparent substrate, which are not shown separately in FIG. 5 and reference may be made to the corresponding description of the first embodiment.

The liquid crystal lens according to the present embodiment differs from the liquid crystal lens in the second embodiment in that in the present embodiment, both the strip electrode 320 and the column spacer 340 are in the shape of polyline. The polyline shape of the strip electrode 320 and the column spacer 340 facilitates further avoiding the interference of lights with the black matrix in the display panel when the 3D display is performed, thus the moire pattern is further avoided.

Another Embodiment

Figure 6:
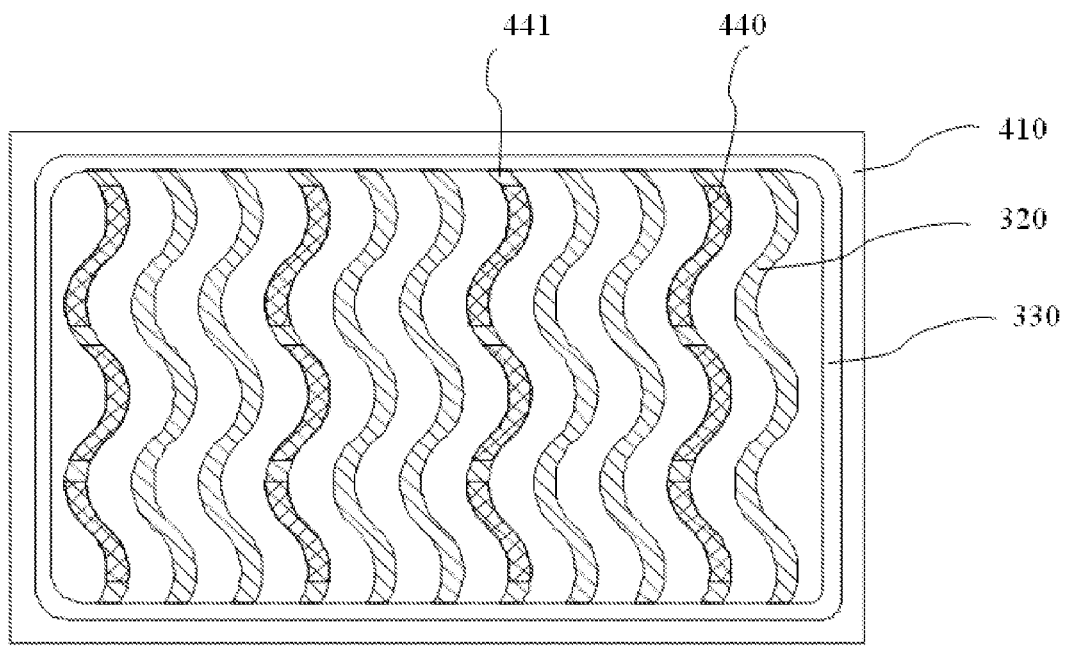
FIG. 6 is a schematic diagram of structures on a first transparent substrate of a liquid crystal lens according to another embodiment of the present invention.

Another embodiment of the present invention further provides another liquid crystal lens. Referring to FIG. 6, FIG. 6 is a schematic diagram of structures on a first transparent substrate 410 of a liquid crystal lens according to another embodiment of the present invention. A first electrode layer (not labeled) including a plurality of strip electrodes 420 is disposed on the first transparent substrate 410, and the strip electrodes 420 are surrounded by sealant 430. Four strip electrodes 420 constitute one strip transparent electrode group (not labeled). In each strip transparent electrode group, the first strip electrode 420 and the last strip electrode 420 are respectively connected with the column spacer 440. Each of the column spacers 440 has four openings 441 running through the column spacer in the width direction of the column spacer 440, and the four openings 441 are distributed evenly in the column spacers 440. For the description of the first transparent substrate 410, the strip electrode 420, the sealant 430, the column spacer 440 and the opening 441, reference may be made to the description of the second embodiment. The liquid crystal lens according to the present embodiment also includes a liquid crystal layer, a second transparent substrate and structures disposed on the second transparent substrate, which are not shown separately in FIG. 6 and reference may be made to the corresponding description of the first embodiment.

The liquid crystal lens according to the present embodiment differs from the liquid crystal lens in the second embodiment in that in the present embodiment, both the strip electrode 420 and the column spacer 440 are in a shape of undulate line. The undulate line shape of the strip electrode 420 and the column spacer 440 facilitates further avoiding the interference of lights with the black matrix in the display panel when the 3D display is performed, thus the moire pattern is further avoided.

Another Embodiment

Another embodiment of the present invention provides a stereoscopic display device, the stereoscopic display device comprises a display panel and any one of the liquid crystal lenses described in the above embodiments. In the stereoscopic display device, the liquid crystal lens is disposed in front of the display panel so that the stereoscopic display device is able to achieve the 3D stereoscopic display.

Since the stereoscopic display device according to the present embodiment includes the liquid crystal lens, the crosstalk phenomenon of the stereoscopic display device caused by the liquid crystal lens may be avoided, and the moire pattern and the scattering of lights may also be avoided.

Another Embodiment

Figure 7:
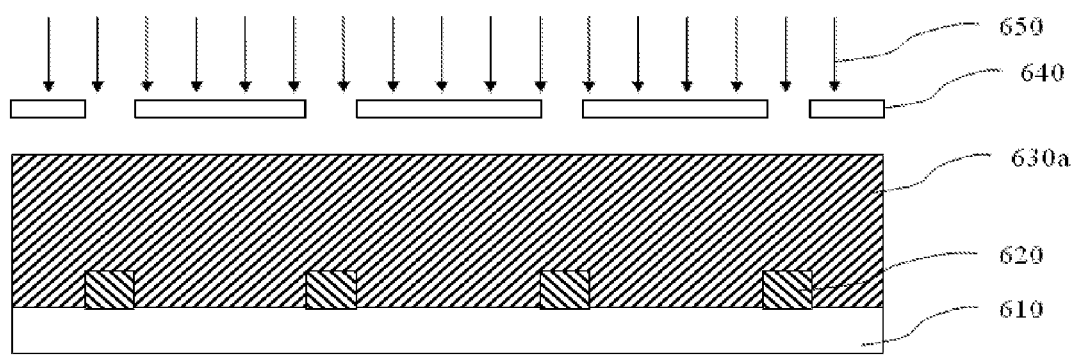
FIGS. 7-8 are schematic diagrams of a process for manufacturing a liquid crystal lens according to another embodiment of the present invention.
Figure 8:
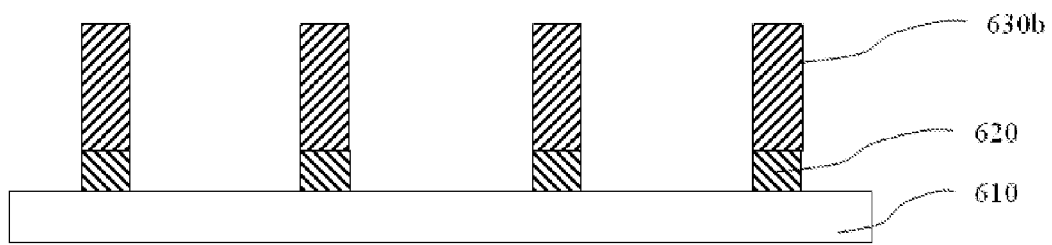

Another embodiment of the present invention provides a process for manufacturing a liquid crystal lens. Referring to FIG. 7 and FIG. 8, FIG. 7 and FIG. 8 are schematic diagrams of a process for manufacturing a liquid crystal lens according to another embodiment of the present invention.

As shown in FIG. 7, the process includes providing a first transparent substrate 610, a first electrode layer (not labeled) including a plurality of strip electrodes 620 on the first transparent substrate 610. The first electrode layer can be divided into a plurality of lens electrode groups (not labeled), and each of the lens electrode groups may include a plurality of strip electrodes 620, for which reference may be made to the related description of the first embodiment. The process further includes providing a second transparent substrate (not shown) having a second electrode layer, for which reference may be made to the description of the first embodiment to the fourth embodiment.

Referring to FIG. 7 in conjunction with FIG. 8, the process further includes forming column spacers 630b on the strip electrodes 620. In the present embodiment, the material of the column spacer 630b includes a photoreactive polymer material. The process for forming the column spacer 630b includes: forming a photoreactive polymer material layer 630a, then adopting an exposure process and a development process on the photoreactive polymer material layer 630a. The exposure process is shown in FIG. 7, under the cover of a mask 640, the photoreactive polymer material layer 630a is exposed to lights 640. After the exposure process, the development process is performed by using photographic developer to remove an undesired part from the photoreactive polymer material 630a, converting the photoreactive polymer material layer 630a into the column spacers 630b, as shown in FIG. 8.

After the column spacers 630b are formed, the first transparent substrate 610 and the second transparent substrate are fixed together to form a liquid crystal cell, meanwhile the column spacers 630b are disposed between the first electrode layer and the second electrode layer and between every two adjacent lens electrode groups. The first transparent substrate 610 and the second transparent substrate can be connected by a sealant. At last, liquid crystal is filled between the first transparent substrate 610 and the second transparent substrate to form the liquid crystal lens, and the sealant can be used to seal the liquid crystal.

It should be noted that, in the present embodiment, the column spacer 630b may include an opening (not shown), and the projection of the column spacer 630b on the first transparent substrate 610 may be in the shape of straight line, polyline or undulate line, for which referring to the description of the first embodiment to the fourth embodiment. Although it is not illustrated in the present embodiment, a first alignment layer can be formed on the first electrode layer and a second alignment layer can be formed on the second electrode layer respectively before the first transparent substrate 610 and the second transparent substrate are fixed together to form a liquid crystal cell.

With the process for manufacturing the liquid crystal lens according to the present embodiment, the liquid crystal lens including the column spacers 630b can be manufactured, and for the manufactured liquid crystal lens, a crosstalk phenomenon caused by the liquid crystal lens may be avoided. In addition, advantages of a simple process and a low process cost are caused by forming the column spacer 630b with mature processes and technologies such as the exposure process and the development process.

Another Embodiment

Another embodiment of the present invention provides a process for manufacturing a stereoscopic display device, and the process includes: forming a liquid crystal lens by the above-mentioned process for manufacturing the liquid crystal lens, providing a display panel, and fixing the display panel and the liquid crystal lens together. Subsequently, packaging process and test process may be performed on the stereoscopic display device.

In the process for manufacturing the stereoscopic display device according to the present embodiment, the liquid crystal lens is manufactured by adopting the above-mentioned process for manufacturing the liquid crystal lens. Therefore, in the manufactured stereoscopic display device, a crosstalk phenomenon caused by the liquid crystal lens can be avoided, and the moire pattern and the scattering of lights can also be avoided. And because the process for manufacturing the liquid crystal lens according to the present invention has advantages of a simple process and a low process cost, the process for manufacturing the stereoscopic display device also has the advantages of the simple process and the low process cost.

Although the present invention is disclosed above, the present invention should not be limited thereto. Various changes and modifications can be made by those skilled in the art without departing from the scope of the present invention. Therefore, the scope of protection of the present invention should be defined by the appending claims.

What is claimed is:

1. A liquid crystal lens, comprising:
   a first transparent substrate and a second transparent substrate disposed opposite to the first transparent substrate;
   a liquid crystal layer disposed between the first transparent substrate and the second transparent substrate;
   a first electrode layer disposed on an internal surface of the first transparent substrate, wherein the first electrode layer comprises a plurality of lens electrode groups, and wherein each of the lens electrode groups comprises a plurality of strip electrodes;
   a second electrode layer disposed on an internal surface of the second transparent substrate; and
   a plurality of column spacers disposed between the first electrode layer and the second electrode layer, wherein each of the plurality of column spacers is disposed between adjacent two of the lens electrode groups;
   wherein the liquid crystal lens further comprises:
   a first alignment layer covering the first electrode layer;
   the each of the plurality of column spacers is disposed on the strip electrode by running through the first alignment layer; and
   the plurality of column spacers are parallel to the strip electrodes, and a projection of each of the plurality of column spacers on the internal surface of the first transparent substrate and a projection of the strip electrode on the internal surface of the first transparent substrate are both in the shape of straight line and have the same size.

2. The liquid crystal lens according to claim 1, wherein the strip electrode extends in a first direction, the strip electrodes are juxtaposed with each other along a second direction.

3. The liquid crystal lens according to claim 1, wherein the projection of the column spacer on the internal surface of the first transparent substrate is in a shape of a straight line, a diagonal line, a polyline or an undulate line.

4. The liquid crystal lens according to claim 1, wherein the column spacer comprises an opening running through the column spacer in the width direction of the column spacer.

5. The liquid crystal lens according to claim 4, wherein a width of the opening is between about 1 μm and about 50 μm, a height of the opening is greater than or equal to 10 μm, and the opening is less than or equal to a height of the column spacer.

6. The liquid crystal lens according to claim 1, wherein a material of the column spacer comprises a photoreactive polymer material.

7. The liquid crystal lens according to claim 1, wherein a refractive index of the column spacer is in a range of 1.45~1.85.

8. The liquid crystal lens according to claim 1, wherein the liquid crystal lens further comprises:
   a second alignment layer covering the second electrode layer; and a sealant sealing the liquid crystal.

9. A stereoscopic display device, comprising:
   a display panel; and
   a liquid crystal lens, wherein the liquid crystal lens comprises:
   a first transparent substrate and a second transparent substrate disposed opposite to the first transparent substrate;
   a liquid crystal layer disposed between the first transparent substrate and the second transparent substrate;
   a first electrode layer disposed on an internal surface of the first transparent substrate, wherein the first electrode layer comprises a plurality of lens electrode groups, and wherein each of the lens electrode groups comprises a plurality of strip electrodes;
   a second electrode layer disposed on an internal surface of the second transparent substrate; and
   a plurality of column spacer disposed between the first electrode layer and the second electrode layer, wherein each of the plurality of column spacers is disposed between two adjacent lens electrode groups;
   wherein the liquid crystal lens further comprises:
   a first alignment layer covering the first electrode layer;
   the each of the plurality of column spacers is disposed on the strip electrode by running through the first alignment layer; and
   column spacers are parallel to the strip electrodes, and a projection of the each of the plurality of column spacers on the internal surface of the first transparent substrate and a projection of the strip electrode on the internal surface of the first transparent substrate are both in the shape of straight line and have the same size.

10. A process for manufacturing a liquid crystal lens, wherein the liquid crystal lens comprises:
    a first transparent substrate and a second transparent substrate disposed opposite to the first transparent substrate;
    a liquid crystal layer disposed between the first transparent substrate and the second transparent substrate;
    a first electrode layer disposed on an internal surface of the first transparent substrate, wherein the first electrode layer comprises a plurality of lens electrode groups, and wherein each of the lens electrode groups comprises a plurality of strip electrodes;
    a second electrode layer disposed on an internal surface of the second transparent substrate; and
    a plurality of column spacers disposed between the first electrode layer and the second electrode layer, wherein each of the plurality of column spacers is disposed between adjacent two of the lens electrode groups;
    wherein the liquid crystal lens further comprises:
    a first alignment layer covering the first electrode layer;
    the each of the plurality of column spacers is disposed on the strip electrode by running through the first alignment layer; and
    the plurality of column spacers are parallel to the strip electrodes, and a projection of each of the plurality of column spacers on the internal surface of the first transparent substrate and a projection of the strip electrode on the internal surface of the first transparent substrate are both in the shape of straight line and have the same size;
    wherein the process comprises:
    providing a first transparent substrate, wherein the first transparent substrate comprises a first electrode layer, the first electrode layer comprises a plurality of lens electrode groups, and each of the lens electrode groups comprises a plurality of strip electrodes;
    providing a second transparent substrate, wherein the second transparent substrate comprises a second electrode layer;
    forming a column spacer on the first electrode layer or on the second electrode layer;
    fixing the first transparent substrate and the second transparent substrate together to form a liquid crystal cell, wherein the column spacer is disposed between the first electrode layer and the second electrode layer and between adjacent two of the lens electrode groups; and
    filling liquid crystal between the first transparent substrate and the second transparent substrate.

11. The process for manufacturing a liquid crystal lens according to claim 10, further comprising:
    forming the column spacer on the first electrode layer; and
    forming a first alignment layer on the first electrode layer before fixing the first transparent substrate and the second transparent substrate together.

12. The process for manufacturing a liquid crystal lens according to claim 11, wherein a material of the column spacer comprises a photoreactive polymer material, and forming the column spacer comprises exposing the column spacer to light and developing the exposed column spacer.

13. The process of manufacturing a liquid crystal lens according to claim 12, wherein forming the column spacer comprises forming an opening running through the column spacer in the width direction of the column spacer.

* * * * *